(12) United States Patent
Khoury et al.

(10) Patent No.: US 11,711,752 B2
(45) Date of Patent: Jul. 25, 2023

(54) BACKWARDS COMPATIBILITY USING SELECTIVE PROBE-RESPONSE SUPPRESSION

(71) Applicant: ARRIS Enterprises LLC, Suwanee, GA (US)

(72) Inventors: Peter G. Khoury, San Francisco, CA (US); Sundar Sankaran, Saratoga, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/832,743

(22) Filed: Jun. 6, 2022

(65) Prior Publication Data

US 2022/0303879 A1 Sep. 22, 2022

Related U.S. Application Data

(63) Continuation of application No. 17/007,136, filed on Aug. 31, 2020, now Pat. No. 11,368,900.

(Continued)

(51) Int. Cl.
*H04W 48/14* (2009.01)
*H04W 48/10* (2009.01)
*H04W 84/12* (2009.01)

(52) U.S. Cl.
CPC .......... *H04W 48/14* (2013.01); *H04W 48/10* (2013.01); *H04W 84/12* (2013.01)

(58) Field of Classification Search
None
See application file for complete search history.

(56) References Cited

U.S. PATENT DOCUMENTS 8,654,732 B2  2/2014  Melkote et al.
9,913,263 B2  3/2018  Park
(Continued)

FOREIGN PATENT DOCUMENTS

GB  2567502 A  4/2019
WO  2017065670 A1  4/2017
WO  2018193128 A1  10/2018

OTHER PUBLICATIONS

"European Search Report in Corresponding Patent Application No. 22192103.4 dated Dec. 7, 2022, 11 pages".

(Continued)

*Primary Examiner* — Hong S Cho
(74) *Attorney, Agent, or Firm* — Steven Stupp; Stewart Wiener

(57) ABSTRACT

An electronic device may advertise a first BSSID and a second BSSID having a common SSID, separate wireless connection interfaces, and different capabilities, where the first BSSID may support a first IEEE 802.11 standard, and the second BSSID may support one or more previous IEEE 802.11 standards, but may not support the first IEEE 802.11 standard. Then, the electronic device may receive a probe request associated with a second electronic device. Moreover, the electronic device may determine whether the second electronic device supports the first IEEE 802.11 standard based at least in part on one or more fields in the probe request. Next, the electronic device may selectively provide a probe response to the second electronic device with one of the first BSSID and the second BSSID based at least in part on the determination.

20 Claims, 12 Drawing Sheets

Related U.S. Application Data

(60) Provisional application No. 62/930,148, filed on Nov. 4, 2019, provisional application No. 62/894,814, filed on Sep. 1, 2019.

(56) References Cited

U.S. PATENT DOCUMENTS

| | | | |
|---|---|---|---|
| 2008/0144591 A1 | 6/2008 | Jokela | |
| 2016/0330663 A1 | 11/2016 | Zhou | |
| 2017/0374681 A1* | 12/2017 | Kim | H04L 69/323 |
| 2019/0124706 A1 | 4/2019 | Huang et al. | |
| 2019/0268825 A1* | 8/2019 | Patil | H04W 40/246 |

OTHER PUBLICATIONS

Patil, Abhishek, "Multiple BSSID Clarifications", 11-19-0028-04-00AX-MULTIPLE-BSSID-CLARIFICATIONS, IEEE-SA Mentor, Piscataway, NJ USA, vol. 802.llax, No. 4. URL:https://mentor.ieee.org/802.11/dcn/19/11-19-0028-04-00ax-multiple-bssid-clarifications.docx [retrieved on Jan. 17, 2019], 2019, 1-5.

"Extended European Search Report for European Application No. 20193975.8, dated Jan. 26, 2021, 10 pages".

Patil, Abhishek, "Multiple BSSID", IEEE Draft; 11-18-0368-07-00AX-Multiple-BSSID, IEEE-SA Mentor, Piscataway, NJ; vol. 802.11ax, No. 7, May 8, 2018; Retrieved from Internet: URL:https://mentor.ieee.org/802.11/dcn/18/11-18-0368-07-00ax-muitipie-bssid.docx [retrieved on May 8, 2018].

* cited by examiner

BACKWARDS COMPATIBILITY USING SELECTIVE PROBE-RESPONSE SUPPRESSION

CROSS REFERENCE TO RELATED APPLICATIONS

This application is a continuation of U.S. patent application Ser. No. 17/007,136, "Backwards Compatibility Using Selective-Probe-Response Suppression," by Peter G. Khoury, et al., filed on Aug. 31, 2020, which claims priority under 35 U.S.C. 119(e) to: U.S. Provisional Application Ser. No. 62/930,148, "Backwards Compatibility Using Selective Probe-Response Suppression," filed on Nov. 4, 2019; and U.S. Provisional Application Ser. No. 62/894,814, "Backwards Compatibility Using Selective Probe-Response Suppression," filed on Sep. 1, 2019, by Peter Khoury, et al., the contents of each of which are herein incorporated by reference.

FIELD

The described embodiments relate to techniques for an access point to provide backwards compatibility by selectively transmitting a probe response in response to a probe request from an electronic device.

BACKGROUND

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless network.

Recently, new wireless standards, such as IEEE 802.11ax, offer additional capabilities to compatible electronic devices relative to previous IEEE 802.11 standards. However, not all of the electronic devices in use support the new wireless standards. This can cause problems for some of these legacy electronic devices in real-world deployments.

For example, in an IEEE 802.11-compatible wireless network, an electronic device often actively scans for a nearby operating access point by transmitting a probe request. In response to receiving a probe request, an access point typically transmits a probe response. However, some legacy electronic devices may not be able to understand a probe response from an access point that is using IEEE-802.11ax (which is sometimes referred to as 'Wi-Fi 6'). Consequently, these legacy electronic devices may not be able to associate with and use this access point. Similarly, some legacy electronic devices may not be able to see a beacon from an access point that is using IEEE-802.11ax during a passive scan, and thus may not be able to associate with and use this access point.

In principle, there are several brute-force solutions for this problem. Notably, in one approach, an IEEE-802.11ax-compatible access point may be downgraded so that it operates using an earlier version of an IEEE 802.11 standard (such as IEEE 802.11ac, which is sometimes referred to as 'Wi-Fi 5'). While this approach will allow all legacy electronic devices to use this access point, the advantages of IEEE 802.11ax will be lost.

Similarly, a network administrator may have separate wireless area networks (WLANs) with different capabilities and names (including different service set identifiers or SSIDs, and different basic service set identifiers or BSSIDs). For example, there may be a first WLAN that supports Wi-Fi 5, and a second WLAN that supports Wi-Fi 6. In this approach, legacy electronic devices can associate with and use the first WLAN, while electronic devices that support IEEE 802.11ax can associate with and use the second WLAN. However, this approach is more complicated and confusing (because it provides users with more than one choice), and does not address the problems that can occur if an electronic device attempts to associate with the wrong WLAN for its capabilities, such as if an IEEE 802.11ax-compatible electronic device associates with the first WLAN that only supports Wi-Fi 5.

SUMMARY

A first group of described embodiments relate to an electronic device (such as an access point). This electronic device includes an interface circuit that wirelessly communicates with a second electronic device. During operation, the electronic device may advertise, from the interface circuit, a first BSSID and a second BSSID having a common SSID (i.e., in the same WLAN), separate wireless connection interfaces, and different capabilities, where the first BSSID may support a first IEEE 802.11 standard, and the second BSSID may support one or more previous IEEE 802.11 standards, but may not support the first IEEE 802.11 standard. Then, the electronic device may receive, from the interface circuit, a probe request associated with the second electronic device. Moreover, the electronic device may determine whether the second electronic device supports the first IEEE 802.11 standard based at least in part on one or more fields in the probe request. Next, the electronic device may selectively provide, to the interface circuit, a probe response intended for the second electronic device with one of the first BSSID and the second BSSID based at least in part on the determination.

For example, the first IEEE 802.11 standard may include IEEE 802.11ax, and the one or more previous IEEE 802.11 standards may include one or more of: IEEE 802.11a, IEEE 802.11b, IEEE 802.11g, IEEE 802.11n, or IEEE 802.11ac. Thus, the first IEEE 802.11 standard may include Wi-Fi 6, and the one or more previous IEEE 802.11 standards may include Wi-Fi 5.

Note that the one or more fields may include a high-efficiency (HE) field in a Media Access Control (MAC) header in the probe request.

Moreover, that the probe response may include the first BSSID when the determination indicates that the second electronic device supports the first IEEE 802.11 standard. Alternatively, the probe response may include the second BSSID when the determination indicates that the second electronic device does not support the first IEEE 802.11 standard. Thus, instead of receiving two probe responses (one for each of the first BSSID and the second BSSID), the second electronic device may receive one probe response with the correct BSSID for its capabilities.

Note that the probe request may include a broadcast probe request, which may include a wild-card SSID or it may include the SSID.

Furthermore, when the probe request includes a directed probe request that includes the second BSSID, and the determination indicates that the second electronic device supports the first IEEE 802.11 standard, the electronic device may provide the probe response to the second electronic device with the second BSSID. Then, after the second electronic device has associated with the electronic device using the second BSSID, the electronic device may recommend that the second electronic device transition to the first BSSID (e.g., using a BSS transition management or BTM frame).

Another embodiment provides a computer-readable storage medium for use with the electronic device. This computer-readable storage medium may include program instructions that, when executed by the electronic device, cause the electronic device to perform at least some of the aforementioned operations.

Another embodiment provides a method. This method includes at least some of the operations performed by the electronic device.

A second group of described embodiments relate to an electronic device (such as an access point). This electronic device includes an interface circuit that wirelessly communicates with a second electronic device. During operation, the electronic device may transmit a multi-BSS beacon with a transmitted BSSID and one or more non-transmitted BSSIDs, and may transmit separate (i.e., individual) beacons for the transmitted BSSID and the one or more non-transmitted BSSIDs. Then, the electronic device may receive, from the interface circuit, a probe request associated with the second electronic device, where the probe request includes a multi-BSS indication. Next, the electronic device may selectively provide, to the interface circuit, one or more probe responses, where the one or more probe responses include a type of probe response that is based at least in part on the multi-BSS indication.

For example, when the multi-BSS indication indicates that the second electronic device supports multi-BSS, the one or more probe responses may include an aggregated probe response for the transmitted BSSID and the one or more non-transmitted BSSIDs. Alternatively, when the multi-BSS indication indicates that the second electronic device does not support multi-BSS, the one or more probe responses may not include the aggregated probe response. Instead, when the probe request is a wild-card probe request, the one or more probe responses may include separate (i.e., individual) probe responses for the transmitted BSSID and the one or more non-transmitted BSSIDs. (Note that this may occur when a legacy transmitted BSSID shares an SSID with a multi-BSS non-transmitted BSSID.) Thus, the type of probe response may include an aggregated probe response for the transmitted BSSID and the one or more non-transmitted BSSIDs, or a probe response for a given BSSID.

Note that, in response to a wild-card probe request, the probe responses may include the transmitted BSSID and the one or more non-transmitted BSSIDs or the transmitted BSSID and one or more additional BSSIDs that correspond to the one or more non-transmitted BSSIDs.

Another embodiment provides a computer-readable storage medium for use with the electronic device. This computer-readable storage medium may include program instructions that, when executed by the electronic device, cause the electronic device to perform at least some of the aforementioned operations.

Another embodiment provides a method. This method includes at least some of the operations performed by the electronic device.

A third group of described embodiments relate to an electronic device (such as an access point). This electronic device includes an interface circuit that wirelessly communicates with a second electronic device. During operation, the electronic device may transmit a multi-BSS beacon with a broadcast bit at a first bit position in the multi-BSS beacon, and one or more unicast bits at one or more second bit positions in the multi-BSS beacon, where a first value of the broadcast bit may specify a broadcast to a group of one or more second electronic devices that are associated with the electronic device, and a given value of a given unicast bit may specify a unicast transmission to a given one of the one or more second electronic devices. Then, the electronic device may transmit a beacon to a second electronic device in the one or more second electronic devices, where the beacon includes a transmitted BSSID in the multi-BSS beacon, a non-transmitted BSSID in the multi-BSS beacon or another BSSID corresponding to the non-transmitted BSSID in the multi-BSS beacon. Moreover, when the first value indicates the broadcast to the group, the beacon may include an element in which the first bit position has a first value indicating the broadcast to the group, and in which a given second bit position in the one or more second bit positions corresponding to the second electronic device has the first value indicating the broadcast to the group.

Note that the broadcast bit and the one or more unicast bits in the multi-BSS beacon may be included in a multi-BSS element in the multi-BSS beacon.

Another embodiment provides a computer-readable storage medium for use with the electronic device. This computer-readable storage medium may include program instructions that, when executed by the electronic device, cause the electronic device to perform at least some of the aforementioned operations.

Another embodiment provides a method. This method includes at least some of the operations performed by the electronic device.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
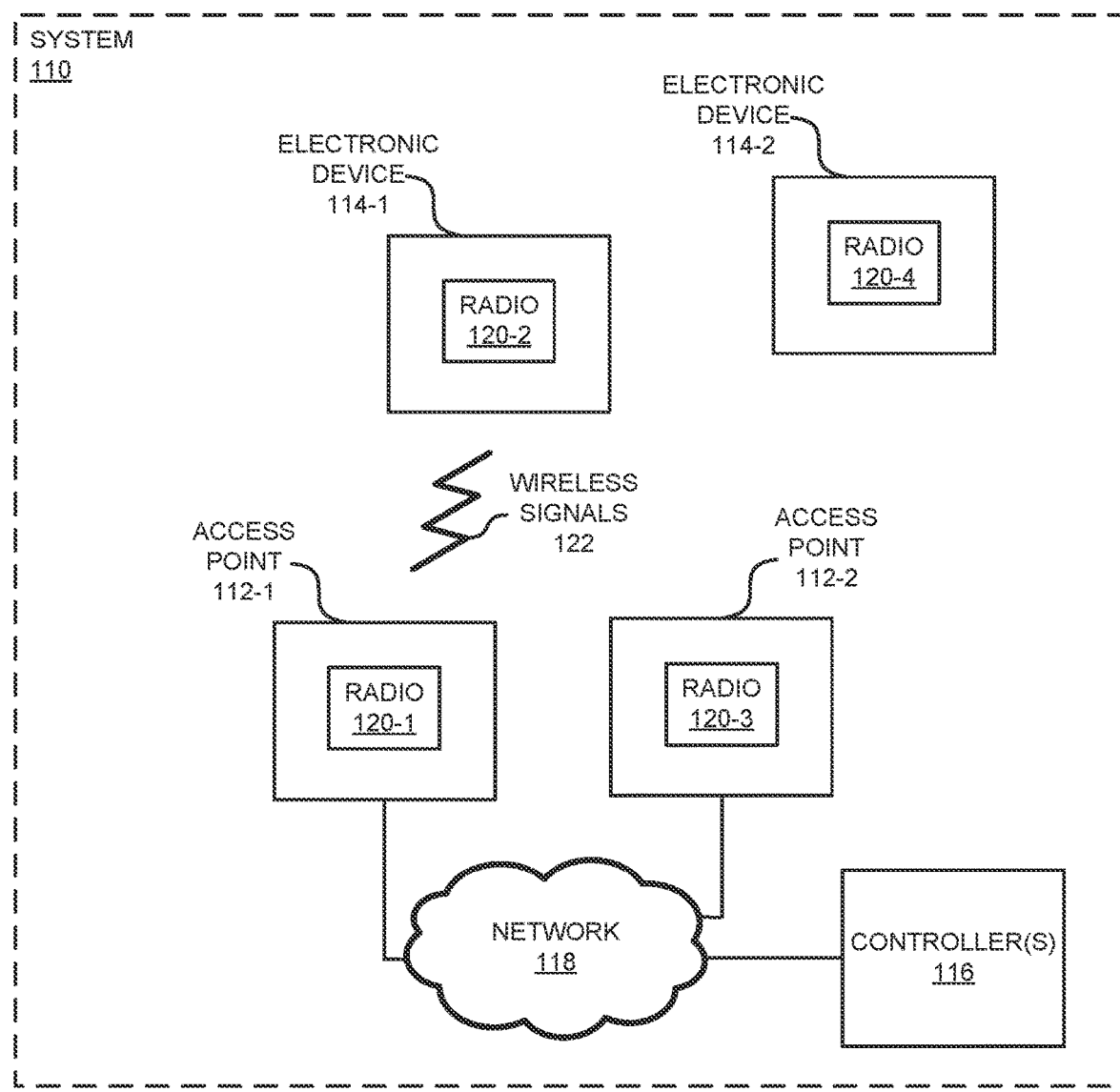
FIG. 1 is a block diagram illustrating an example of a system in accordance with an embodiment of the present disclosure.

In a first group of embodiments of communication techniques, an electronic device (such as an access point) may advertise (by transmitting beacons) a first BSSID and a second BSSID having a common SSID (i.e., in the same WLAN), separate wireless connection interfaces, and different capabilities, where the first BSSID may support a first IEEE 802.11 standard, and the second BSSID may support one or more other (e.g., previous) IEEE 802.11 standards, but may not support the first IEEE 802.11 standard. Then, the electronic device may receive a probe request associated with a second electronic device. Moreover, the electronic device may determine whether the second electronic device supports the first IEEE 802.11 standard based at least in part on one or more fields in the probe request. Next, the electronic device may selectively provide a probe response to the second electronic device with one of the first BSSID and the second BSSID based at least in part on the determination. For example, the probe response may be provided with the BSSID that matches the capabilities of the second electronic device.

By selectively providing the probe response, the communication techniques may provide backwards compatibility. Notably, when the second electronic device supports the first IEEE 802.11 standard, the probe response may include the first BSSID. Alternatively, when the second electronic device supports the first IEEE 802.11 standard and the probe request includes the second BSSID, the probe response may include the second BSSID and, subsequently, the electronic device may recommend that the second electronic device transition to the first BSSID. Furthermore, when the second electronic device does not support the first IEEE 802.11 standard, the probe response may include the second BSSID. This capability may allow legacy electronic devices and new electronic devices to coexist and to be supported by the electronic device. Consequently, the communication techniques may reduce user frustration when using the electronic device, the second electronic device and the associated wireless network and, thus, may provide an improved user experience.

In a second group of embodiments of communication techniques, an electronic device (such as an access point) may transmit a multi-BSS beacon with a transmitted BSSID and one or more non-transmitted BSSIDs, and may transmit separate (i.e., individual) beacons for the transmitted BSSID and the one or more non-transmitted BSSIDs. Then, the electronic device may receive a probe request associated with the second electronic device, where the probe request includes a multi-BSS indication. Next, the electronic device may selectively provide one or more probe response, where the one or more probe responses include a type of probe response that is based at least in part on the multi-BSS indication.

By selectively providing the probe response, the communication techniques may provide backwards compatibility and may reduce management-frame overhead. Notably, when the multi-BSS indication indicates that the second electronic device supports multi-BSS, the one or more probe responses include an aggregated probe response for the transmitted BSSID and the one or more non-transmitted BSSIDs. Alternatively, when the multi-BSS indication indicates that the second electronic device does not support multi-BSS, the one or more probe responses may not include the aggregated probe response. Instead, when the probe request is a wild-card probe request, the one or more probe responses may include separate (i.e., individual) probe responses for the transmitted BSSID and the one or more non-transmitted BSSIDs. This capability may allow legacy electronic devices that do not support multi-BSS and new electronic devices to coexist and to be supported by the electronic device. Consequently, the communication techniques may reduce management-frame overhead and may provide more effective scans. Thus, the communication techniques may improve communication performance, may reduce user frustration when using the electronic device, the second electronic device and the associated wireless network and, thus, may provide an improved user experience.

In a third group of embodiments of communication techniques, an electronic device (such as an access point) may transmit a multi-BSS beacon with a broadcast bit at a first bit position in the multi-BSS beacon, and one or more unicast bits at one or more second bit positions in the multi-BSS beacon. These bits may, respectively, indicate or specify a broadcast to a group of one or more second electronic devices that are associated with the electronic device, or a unicast transmission to a given one of the one or more second electronic devices. Then, the electronic device may transmit a beacon to a second electronic device in the one or more second electronic devices. In some cases, the probe response may be a legacy probe response that may not be configured in accordance with a latest version of a communication standard. When there us broadcast traffic for the group, the beacon may include an element in which the first bit position has a first value indicating the broadcast to the group, and in which a given second bit position in the one or more second bit positions corresponding to the second electronic device has the first value indicating the broadcast to the group.

By providing indications of the broadcast to the group in the first bit position and the given second bit position, the communication techniques may ensure that a multi-BSS-compatible electronic device that receives the beacon detects the indication of the broadcast to the group. Notably, electronic devices that support an IEEE 802.11 standard such as Wi-Fi 6 may not look for or may miss the first bit position in the beacon. Therefore, to ensure that they detect the indication of the broadcast to the group in such a legacy beacon, the beacon may have a duplicate or redundant indication at the given second bit position. Moreover, by reserving the one or more second bit positions in legacy beacons for the one or more second electronic devices, these legacy beacons may be compatible with or consistent with the multi-BSS beacon. This capability may allow legacy electronic devices that do not support multi-BSS and new electronic devices that support multi-BSS to coexist. Consequently, the communication techniques may provide more effective scans. Thus, the communication techniques may reduce user frustration when using the electronic device, the second electronic device and the associated wireless network and, thus, may provide an improved user experience.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Tex.), Bluetooth, and/or another type of wireless interface (such as another wireless-local-area-network interface). Moreover, an access point in the system may communicate with a controller or services using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi and Ethernet are used as illustrative examples.

We now describe some embodiments of the communication techniques. FIG. 1 presents a block diagram illustrating an example of a system 110, which may include components, such as: one or more access points 112, one or more electronic devices 114 (such as cellular telephones, stations or clients, another type of electronic device, etc.), and one or more optional controllers 116. In system 110, one or more of the one or more access points 112 may wirelessly communicate with one or more of the one or more electronic devices 114 using wireless communication that is compatible with an IEEE 802.11 standard. Thus, the wireless communication may occur in, e.g., a 2.4 GHz, a 5 GHz and/or a 60 GHz frequency band. (Note that IEEE 802.11 ad communication over a 60 GHz frequency band is sometimes referred to as 'WiGig.' In the present discussion, these embodiments are also encompassed by 'Wi-Fi.') However, a wide variety of frequency bands may be used. Moreover, the one or more access points 112 may communicate with the one or more optional controllers 116 via network 118 (such as the Internet, an intra-net and/or one or more dedicated links). Note that the one or more optional controllers 116 may be at the same location as the other components in system 110 or may be located remotely (i.e., at a different location). Moreover, note that the one or more access points 112 may be managed and/or configured by the one or more optional controllers 116. Furthermore, note that the one or more access points 112 may provide access to network 118 (e.g., via an Ethernet protocol), and may be a physical access point or a virtual or 'software' access point that is implemented on a computer or an electronic device. While not shown in FIG. 1, there may be additional components or electronic devices, such as a router.

Additionally, as noted previously, the one or more access points 112 and the one or more electronic devices 114 may communicate via wireless communication. Notably, one or more of access points 112 and one or more of electronic devices 114 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

Figure 12:
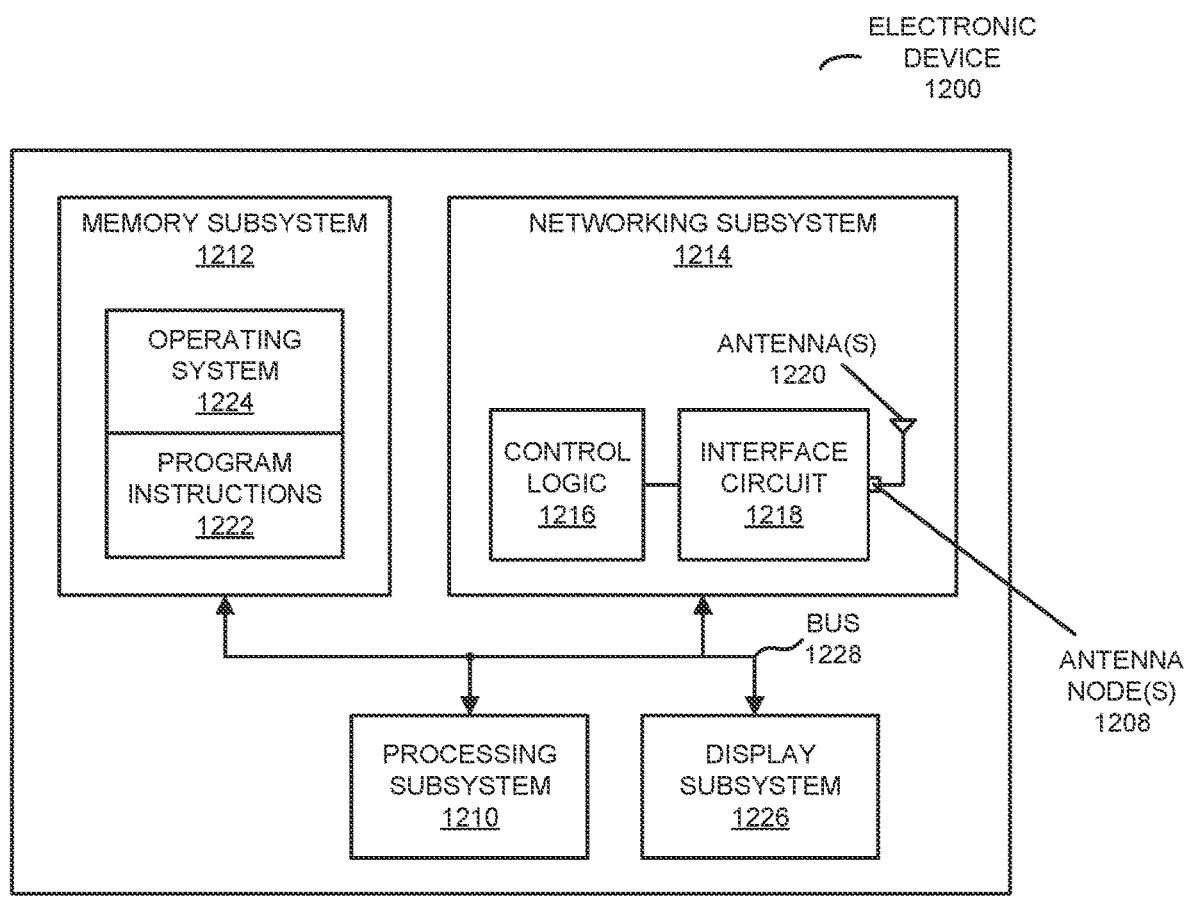
FIG. 12 is a block diagram illustrating an example of an electronic device in accordance with an embodiment of the present disclosure.

As described further below with reference to FIG. 12, the one or more access points 112, the one or more electronic devices 114 and/or the one or more optional controllers 116 may include subsystems, such as a networking subsystem, a memory subsystem and a processor subsystem. In addition, the one or more access points 112 and the one or more electronic devices 114 may include radios 120 in the networking subsystems. More generally, the one or more access points 112 and the one or more electronic devices 114 can include (or can be included within) any electronic devices with the networking subsystems that enable the one or more access points 112 and the one or more electronic devices 114 to wirelessly communicate with each other.

As can be seen in FIG. 1, wireless signals 122 (represented by a jagged line) are transmitted from a radio 120-2 in electronic device 114-1. These wireless signals are received by radio 120-1 in at least one of the one or more access points 112, such as access point 112-1. Notably, electronic device 114-1 may transmit frames or packets. In turn, these frames or packets may be received by access point 112-1. This may allow electronic device 114-1 to communicate information to access point 112-1. Note that the communication between electronic device 114-1 and access point 112-1 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 120 are shown in the one or more electronic devices 114 and the one or more access points 112, one or more of these instances may be different from the other instances of radios 120.

As noted previously, electronic devices 114 may regularly transmit multiple probe requests. If an access point (such as access point 112-1) is compatible with and uses an IEEE 802.11 standard that is not supported by a legacy electronic device (such as electronic device 114-1) that has a radio from a particular manufacturer (i.e., electronic device 114-1 may be in a subset of legacy electronic devices), then, when access point 112-1 provides a probe response in response to a probe request from electronic device 114-1 (such as a wild-card probe request), electronic device 114-1 may not be able to receive the probe response. This may prevent electronic device 114-1 from associating with and, thus, communicating with access point 112-1. Similarly, while access point 112-1 may broadcast beacons, electronic device 112-1 may not be able to receive the beacons during a passive scan. Once again, this may prevent electronic device 114-1 from associating with and, thus, communicating with access point 112-1.

In order to address these challenges, at least one of access points 112 (such as an access point that supports a new IEEE 802.11 standard, e.g., access point 112-1) may implement or use the communication techniques according to embodiments of the present disclosure. Notably, as discussed further below with reference to FIGS. 2-3, during the communication techniques access point 112-1 may advertise a first BSSID and a second BSSID having a common SSID (i.e., in the same WLAN), separate wireless connection interfaces, and different capabilities. For example, the first BSSID may support a first IEEE 802.11 standard, and the second BSSID may support one or more previous IEEE 802.11 standards, but may not support the first IEEE 802.11 standard. In some embodiments, the first IEEE 802.11 standard may include IEEE 802.11ax, and the one or more previous IEEE 802.11 standards may include one or more of: IEEE 802.11a, IEEE 802.11b, IEEE 802.11g, IEEE 802.11n, or IEEE 802.11ac. Thus, the first IEEE 802.11 standard may include Wi-Fi 6, and the one or more previous IEEE 802.11 standards may include Wi-Fi 5.

Then, access point 112-1 may receive a probe request from electronic device 114-1. Moreover, access point 112-1 may determine whether electronic device 114-1 supports the first IEEE 802.11 standard based at least in part on one or more fields in the probe request. For example, the one or more fields may include at least an HE field in a MAC header in the probe request. When the HE field is present, access point 112-1 may determine that electronic device 114-1 supports the first IEEE 802.11 standard.

Next, access point 112-1 may selectively provide a probe response to electronic device 114-1 based at least in part on the determination. For example, the probe response may include the first BSSID when the determination indicates that electronic device 114-1 supports the first standard. Furthermore, the probe response may include the second BSSID when the determination indicates that electronic device 114-1 does not support the first IEEE 802.11 standard.

Note that access point 112-1 may respond to directed probe requests that include the first BSSID or the second BSSID with a corresponding probe response that includes the first BSSID or the second BSSID. For example, when the probe request includes the second BSSID and the determination indicates that electronic device 114-1 supports the first IEEE 802.11 standard, access point 112-1 may provide the probe response with the second BSSID to electronic device 114-1. Then, after electronic device 114-1 has associated with access point 112-1 using the second BSSID, access point 112-1 may recommend that electronic device 114-1 transition to the first BSSID (e.g., using a BSS transition management or BTM frame).

In these ways, access points that use the communication techniques may provide backwards compatibility to legacy electronic devices and may support electronic devices that support and use a new IEEE 802.11 standard (such as the first IEEE 802.11 standard). Notably, access point 112-1 may ensure that electronic device 114-1 selectively receives an appropriate probe response (including the correct BSSID) based at least in part on the capabilities of electronic device 114-1 (such as whether or not electronic device 114-1 supports the first IEEE 802.11 standard). Thus, the communication techniques may allow legacy electronic devices and new electronic devices to coexist and to be supported by access point 112-1, while minimizing management traffic. Consequently, the communication techniques may reduce user frustration when using access point 112-1, electronic device 114-1 and the associated WLAN having the common SSID and, thus, may provide an improved user experience.

Similarly, multi-BSS capability allows access points to aggregate beacons and/or probe responses together, which can reduce management from overhead in a WLAN. However, not all of electronic devices 114 may support multi-BSS capability. Thus, once again, there may be a coexistence problem, in which different electronic devices in operation in an environment have different capabilities.

In order to address these challenges, at least one of access points 112 (such as an access point that supports multi-BSS, e.g., access point 112-1) may implement or use the communication techniques. Notably, as discussed further below with reference to FIGS. 4-7, during the communication techniques access point 112-1 may transmit a multi-BSS beacon with a transmitted BSSID and one or more non-transmitted BSSIDs, and may transmit separate (i.e., individual) beacons for the transmitted BSSID and the one or more non-transmitted BSSIDs. Then, access point 112-1 may receive a probe request associated with electronic device 114-1, where the probe request includes a multi-BSS indication (such as a multi-BSS bit). Next, access point 112-1 may selectively provide one or more probe responses, where the one or more probe responses include a type of probe response that is based at least in part on the multi-BSS indication.

For example, when the multi-BSS indication indicates that electronic device 114-1 supports multi-BSS, the one or more probe responses may include an aggregated probe response for the transmitted BSSID and the one or more non-transmitted BSSIDs. Alternatively, when the multi-BSS indication indicates that electronic device 114-1 does not support multi-BSS, the one or more probe responses may not include the aggregated probe response. Instead, when the probe request is a wild-card probe request, the one or more probe responses may include separate (i.e., individual) probe responses for the transmitted BSSID and the one or more non-transmitted BSSIDs. (Note that the BSSIDs in the individual probe responses for the one or more non-transmitted BSSIDs may correspond to the one or more non-transmitted BSSIDs, because they have the same SSIDs as the one or more non-transmitted BSSIDs, but these BSSIDs may not be the same as the one or more non-transmitted BSSIDs. This is because legacy electronic devices do not support the aggregated or multi-BSS feature, so access point 112-1 may have separate wireless connection interfaces with the corresponding (but different) BSSIDs and, as noted previously, the same SSIDs as the one or more non-transmitted BSSIDs. However, in some embodiments, the individual probe responses for the one or more non-transmitted BSSIDs may include the one or more non-transmitted BSSIDs.) Thus, the type of probe response may include an aggregated probe response for the transmitted BSSID and the one or more non-transmitted BSSIDs, or a probe response for a given BSSID.

Moreover, as described further below with reference to FIGS. 8-11, during the communication techniques access point 112-1 may transmit a multi-BSS beacon. The multi-BSS beacon may include a broadcast bit at a first bit position in the multi-BSS beacon, and one or more unicast bits at one or more second bit positions in the multi-BSS beacon. Moreover, a first value of the broadcast bit may specify a broadcast to a group of one or more of electronic devices 114 that are associated with access point 112-1, and a given value of a given unicast bit may specify a unicast transmission to a given one of the one or more electronic devices 114 (such as electronic device 114-1).

Then, access point 112-1 may transmit a beacon to electronic device 114-1, where the beacon includes a transmitted BSSID in the multi-BSS beacon, a non-transmitted BSSID in the multi-BSS beacon or another BSSID corresponding to the non-transmitted BSSID in the multi-BSS beacon. Moreover, when the broadcast bit has the first value indicating the broadcast is to the group, the beacon may include an element in which the first bit position has a first value indicating the broadcast to the group, and in which a given second bit position in the one or more second bit positions corresponding to the second electronic device has the first value indicating the broadcast to the group.

In these ways, access points that use the communication techniques may provide backwards compatibility to legacy electronic devices and may support electronic devices that support and use multi-BSS. Notably, access point 112-1 may ensure that electronic device 114-1 selectively receives an appropriate type of probe response based at least in part on the capabilities of electronic device 114-1 (such as whether or not electronic device 114-1 supports multi-BSS). Thus, the communication techniques may allow legacy electronic devices and new electronic devices to coexist and to be supported by access point 112-1. Consequently, the communication techniques may reduce the number of probe responses (and, thus, the probe-response management overhead) in the WLAN, may improve performance and reduce user frustration when using access point 112-1, electronic device 114-1 and the associated WLAN and, thus, may provide an improved user experience.

In the described embodiments, processing a frame or a packet in a given one of the one or more access points 112 or a given one of the one or more electronic devices 114 may include: receiving wireless signals 122 with the frame or packet; decoding/extracting the frame or packet from the received wireless signals 122 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 112, the one or more electronic devices 114 and/or the one or more optional controllers 116. As another example, in another embodiment, different electronic devices are transmitting and/or receiving frames or packets.

Figure 2:
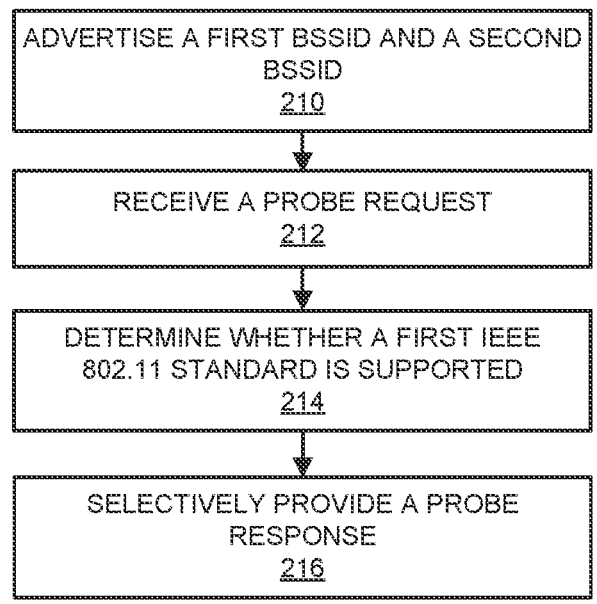
FIG. 2 is a flow diagram illustrating an example method for selectively providing a probe response in the system in FIG. 1 in accordance with an embodiment of the present disclosure.

We now describe embodiments of the method. FIG. 2 presents an example of a flow diagram illustrating an example method 200 for selectively providing a probe response. Moreover, method 200 may be performed by an electronic device, such as one of the one or more access points 112 in FIG. 1, e.g., access point 112-1.

During operation, an electronic device may advertise a first BSSID and a second BSSID (operation 210) having a common SSID, separate wireless connection interfaces, and different capabilities, where the first BSSID may support a first IEEE 802.11 standard, and the second BSSID may support one or more previous IEEE 802.11 standards, but may not support the first IEEE 802.11 standard. For example, the first IEEE 802.11 standard may include IEEE 802.11ax, and the one or more previous IEEE 802.11 standards may include one or more of: IEEE 802.11a, IEEE 802.11b, IEEE 802.11g, IEEE 802.11n, or IEEE 802.11ac. Thus, the first IEEE 802.11 standard may include Wi-Fi 6, and the one or more previous IEEE 802.11 standards may include Wi-Fi 5.

Then, the electronic device may receive a probe request (operation 212) associated with a second electronic device. Moreover, the electronic device may determine whether the second electronic device supports the first IEEE 802.11 standard (operation 214) based at least in part on one or more fields in the probe request. Note that the one or more fields may include an HE field in a MAC header in the probe request, and the determination may be based at least in part on the presence or absence of at least the HE field.

Next, the electronic device may selectively provide a probe response (operation 216) intended for the second electronic device based at least in part on the determination. For example, the probe response may include the first BSSID when the determination indicates that the second electronic device supports the first IEEE 802.11 standard. Furthermore, the probe response may include the second BSSID when the determination indicates that the second electronic device does not support the first IEEE 802.11 standard.

Note that the probe request may include a broadcast probe request, which may include a wild-card SSID or it may include the SSID. However, when the probe request includes a BSSID (i.e., the probe request is a directed probe request), the electronic device may provide a probe response with the BSSID, even if it does not match the capabilities of the second electronic device. However, when this occurs, the electronic device may perform a remedial action. For example, when the determination indicates that the second electronic device supports the first IEEE 802.11 standard and the probe request includes the second BSSID, the electronic device may provide the probe response with the second BSSID to the second electronic device. Then, after the second electronic device has associated with the electronic device using the second BSSID, the electronic device may recommend that the second electronic device transition to the first BSSID.

Figure 3:
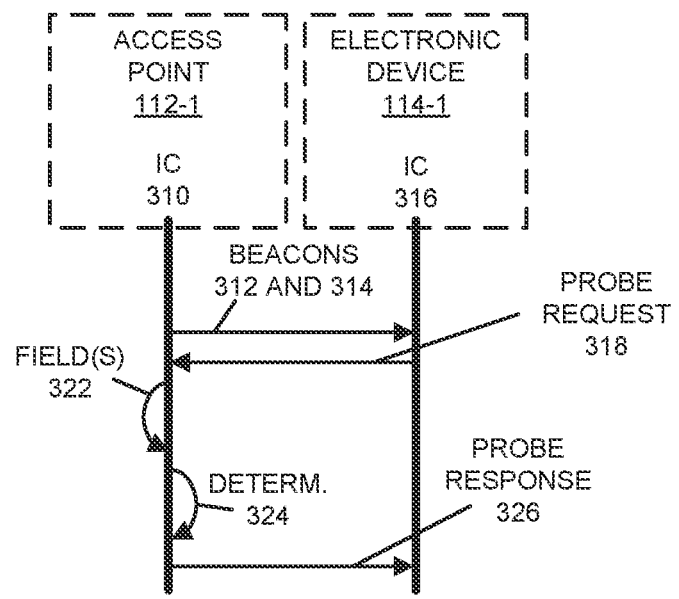
FIG. 3 is a drawing illustrating an example of communication among electronic devices in FIG. 1 in accordance with an embodiment of the present disclosure.

FIG. 3 presents a drawing illustrating an example of communication between access point 112-1 and electronic device 114-1. In FIG. 3, an interface circuit (IC) 310 in access point 112-1 may transmit or provide a beacon 312 with a first BSSID and a beacon 314 with a second BSSID. These BSSIDs may have a common SSID, separate wireless connection interfaces, and different capabilities. For example, the first BSSID may support a first IEEE 802.11 standard, and the second BSSID may support one or more previous IEEE 802.11 standards, but may not support the first IEEE 802.11 standard.

In response to at least one of beacons 312 and 314, an interface circuit 316 in electronic device 114-1 may provide a probe request 318. After receiving probe request 318, interface circuit 310 may determine 324 whether electronic device 114-1 supports the first IEEE 802.11 standard based at least in part on one or more fields 322 in probe request 318.

Next, interface circuit 310 may selectively provide a probe response 326 to electronic device 114-1 based at least in part on the determination 324. For example, probe response 326 may include the appropriate BSSID (i.e., the first BSSID or the second BSSID) that has capabilities that match those of electronic device 114-1.

Figure 4:
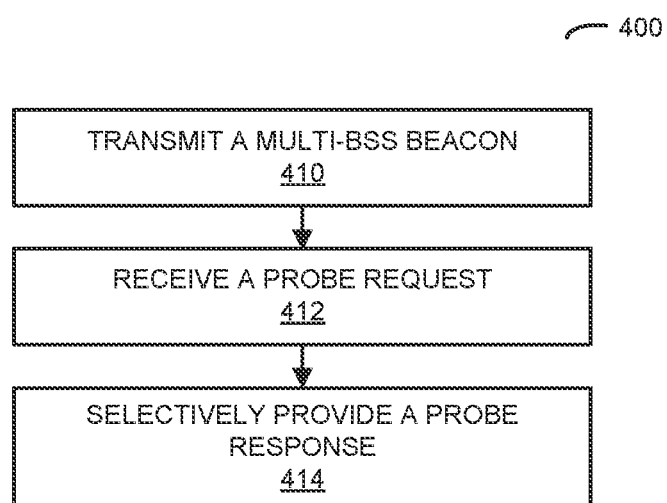
FIG. 4 is a flow diagram illustrating an example method for selectively providing a probe response in the system in FIG. 1 in accordance with an embodiment of the present disclosure.

FIG. 4 presents an example of a flow diagram illustrating an example method 400 for selectively providing a probe response. Moreover, method 400 may be performed by an electronic device, such as one of the one or more access points 112 in FIG. 1, e.g., access point 112-1.

During operation, an electronic device may transmit a multi-BSS beacon (operation 410) with a transmitted BSSID and one or more non-transmitted BSSIDs, and may transmit separate beacons for the transmitted BSSID and the one or more non-transmitted BSSIDs. Then, the electronic device may receive a probe request (operation 412) associated with the second electronic device, where the probe request includes a multi-BSS indication. Next, the electronic device may selectively provide one or more probe responses (operation 414), where the one or more probe responses include a type of probe response that is based at least in part on the multi-BSS indication.

For example, when the multi-BSS indication indicates that the second electronic device supports multi-BSS, the one or more probe responses may include an aggregated probe response for the transmitted BSSID and the one or more non-transmitted BSSIDs. Alternatively, when the multi-BSS indication indicates that the second electronic device does not support multi-BSS, the one or more probe responses may not include the aggregated probe response. Instead, when the probe request is a wild-card probe request, the one or more probe responses may include separate probe responses for the transmitted BSSID and the one or more non-transmitted BSSIDs. Thus, the type of probe response may include an aggregated probe response for the transmitted BSSID and the one or more non-transmitted BSSIDs, or a probe response for a given BSSID (e.g., a set of probe responses for each of the BSSIDs).

Note that, in response to a wild-card probe request, the probe responses may include the transmitted BSSID and the one or more non-transmitted BSSIDs or the transmitted BSSID and one or more additional BSSIDs that correspond to the one or more non-transmitted BSSIDs.

Figure 5:
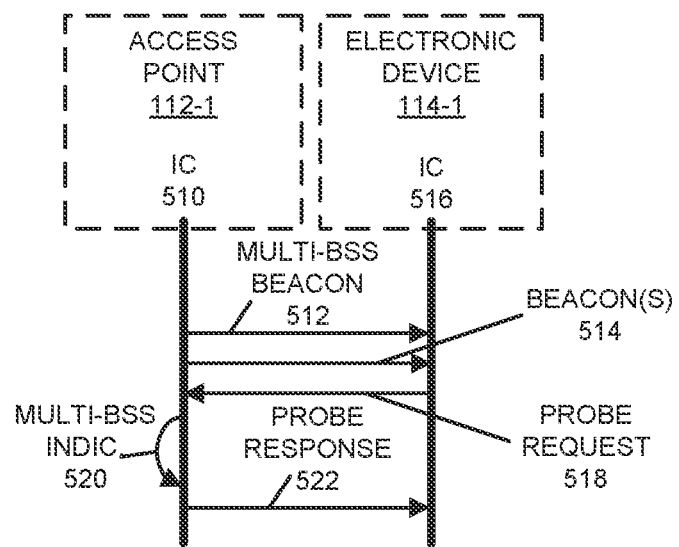
FIG. 5 is a drawing illustrating an example of communication among electronic devices in FIG. 1 in accordance with an embodiment of the present disclosure.

FIG. 5 presents a drawing illustrating an example of communication between access point 112-1 and electronic device 114-1. In FIG. 5, an interface circuit 510 in access point 112-1 may transmit or provide a multi-BSS beacon 512 with a transmitted BSSID and one or more non-transmitted BSSIDs, and may transmit separate beacons 514 for the transmitted BSSID and the one or more non-transmitted BSSIDs.

In response to at least one of the multi-BSS beacon 512 or one of beacons 514, an interface circuit 516 in electronic device 114-1 may provide a probe request 518 to access point 112-1. This probe request may include a multi-BSS indication 520.

After receiving probe request 518, interface circuit 510 may selectively provide one or more probe responses 522, where the one or more probe responses 522 include a type of probe response that is based at least in part on the multi-BSS indication 520. For example, when the multi-BSS indication 520 indicates that electronic device 114-1 supports multi-BSS, the one or more probe responses 522 may include an aggregate probe response for the transmitted BSSID and the one or more non-transmitted BSSIDs. Alternatively, when the multi-BSS indication 520 indicates that electronic device 114-1 does not support multi-BSS, the one or more probe responses 522 may include separate probe responses for the transmitted BSSID and each of the one or more non-transmitted BSSIDs.

Figure 6:
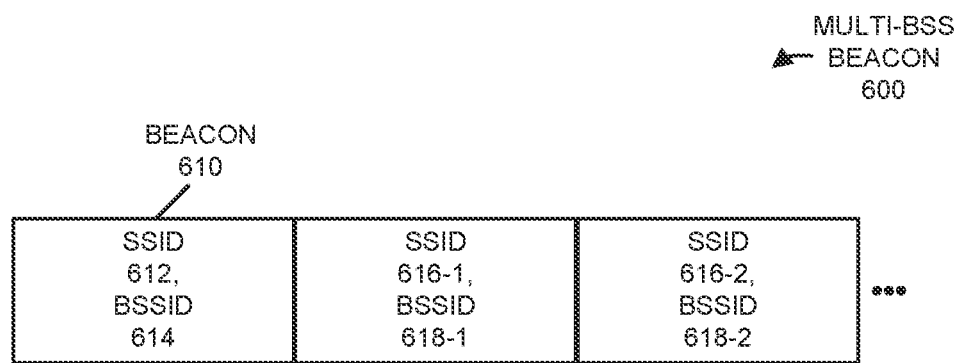
FIG. 6 is a drawing illustrating an example of a multi-basic-service-set (BSS) beacon in accordance with an embodiment of the present disclosure.

FIG. 6 presents a drawing illustrating an example of a multi-BSS beacon 600. Notably, the multi-BSS beacon 600 may include a beacon 610 with an SSID 612 and a BSSID 614 (which is sometimes referred to as a 'transmitted BSSID'). In addition, the multi-BSS beacon 600 may include SSIDs 616 and associated BSSIDs 618 (which are sometimes referred to as 'non-transmitted BSSIDs'). For example, BSSID 618-1 may equal BSSID 614 plus one, BSSID 618-2 may equal BSSID 614 plus two, etc.

Figure 7:
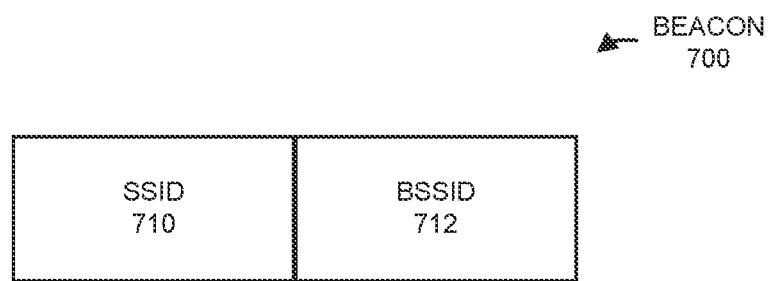
FIG. 7 is a drawing illustrating an example of a beacon in accordance with an embodiment of the present disclosure.

FIG. 7 presents a drawing illustrating an example of a beacon 700 for a particular BSSID. Notably, beacon 700 may include an SSID 710 (which may be one of SSID 612 or one of SSIDs 616) and a BSSID 712. In some embodiments, a legacy beacon (such as beacon 700) may be identified relative to a multi-BSS beacon (such as multi-BSS beacon 600 in FIG. 6) by the inclusion of a MAC address in the beacon.

Note that the multi-BSS beacon 600 (FIG. 6) and/or beacon 700 may include additional information, less information or different information from that shown in FIGS. 6 and 7.

Figure 8:
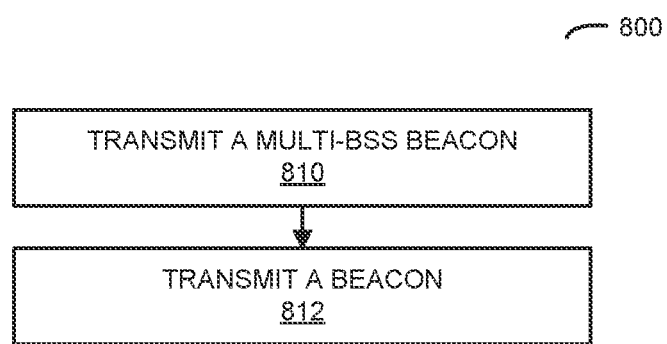
FIG. 8 is a flow diagram illustrating an example method for providing a beacon in the system in FIG. 1 in accordance with an embodiment of the present disclosure.

FIG. 8 presents a flow diagram illustrating an example method 800 for providing a beacon. Moreover, method 800 may be performed by an electronic device, such as one of the one or more access points 112 in FIG. 1, e.g., access point 112-1.

During operation, an electronic device (e.g., access point 112-1) may transmit a multi-BSS beacon (operation 810) with a broadcast bit at a first bit position in the multi-BSS beacon, and one or more unicast bits at one or more second bit positions in the multi-BSS beacon, where a first value of the broadcast bit may specify a broadcast to a group of one or more second electronic devices that are associated with the electronic device, and a given value of a given unicast bit may specify a unicast transmission to a given one of the one or more second electronic devices. Then, the electronic device may transmit a beacon (operation 812) to a second electronic device in the one or more second electronic devices, where the beacon includes a transmitted BSSID in the multi-BSS beacon, a non-transmitted BSSID in the multi-BSS beacon or another BSSID corresponding to the non-transmitted BSSID in the multi-BSS beacon. Moreover, when there is broadcast traffic for the group, the beacon may include an element in which the first bit position has a first value indicating the broadcast to the group, and in which a given second bit position in the one or more second bit positions corresponding to the second electronic device has the first value indicating the broadcast to the group.

Note that the broadcast bit and the one or more unicast bits in the multi-BSS beacon may be included in a multi-BSS element in the multi-BSS beacon.

In some embodiments of methods 200 (FIG. 2), 400 (FIG. 4) and/or 800, there may be additional or fewer operations. Moreover, there may be different operations. Furthermore, the order of the operations may be changed, and/or two or more operations may be combined into a single operation.

Figure 9:
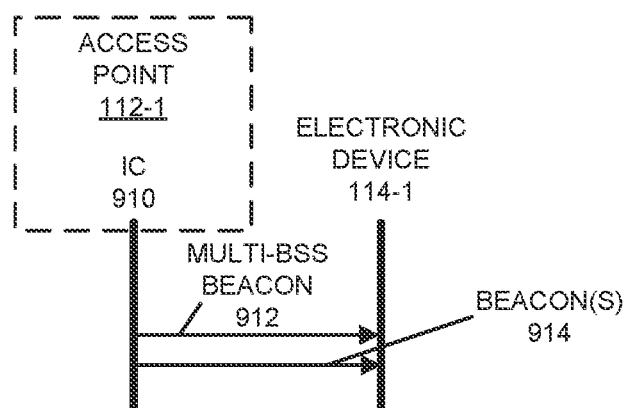
FIG. 9 is a drawing illustrating an example of communication among electronic devices in FIG. 1 in accordance with an embodiment of the present disclosure.

FIG. 9 presents a drawing illustrating an example of communication between access point 112-1 and electronic device 114-1. In FIG. 9, an interface circuit 910 in access point 112-1 may transmit or provide a multi-BSS beacon 912 with a transmitted BSSID and one or more non-transmitted BSSIDs, and may transmit separate beacons 914 for the transmitted BSSID and the one or more non-transmitted BSSIDs. Note that multi-BSS beacon 912 may include a broadcast bit at a first bit position in the multi-BSS beacon, and one or more unicast bits at one or more second bit positions in the multi-BSS beacon.

Moreover, one of beacons 914, which is transmitted to electronic device 114-1, may include the transmitted BSSID in multi-BSS beacon 912, the non-transmitted BSSID in multi-BSS beacon 912 or the other BSSID corresponding to the non-transmitted BSSID in multi-BSS beacon 912. Moreover, when there is broadcast traffic for the group, beacon 918 may include an element in which the first bit position has a first value indicating the broadcast to the group, and in which a given second bit position in the one or more second bit positions corresponding to the second electronic device has the first value indicating the broadcast to the group.

While FIGS. 3, 5 and 9 illustrate some operations using unilateral or bilateral communication (which are, respectively, represented by one-sided and two-sided arrows), in general a given operation in FIGS. 3, 5 and 9 may involve unilateral or bilateral communication.

Figure 10:
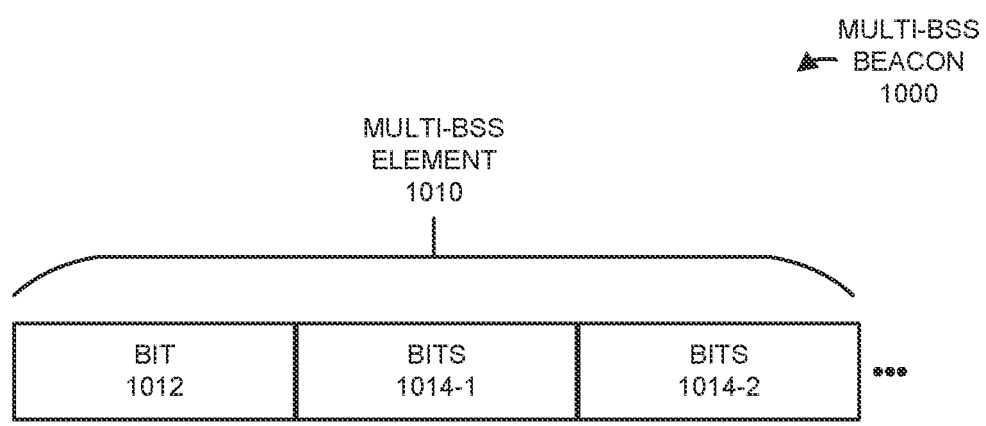
FIG. 10 is a drawing illustrating an example of a multi-BSS beacon in accordance with an embodiment of the present disclosure.

FIG. 10 presents a drawing illustrating an example of a multi-BSS beacon 1000. Notably, the multi-BSS beacon 1000 may include a multi-BSS element 1010. A bit 1012 (such as bit zero) in multi-BSS element 1010 may be a broadcast bit, and bits 1014 (such as bits one, two and three) in multi-BSS element 1010 may be unicast bits. As discussed previously, a first value (such as '1') of the broadcast bit may specify a broadcast to a group of electronic devices that are associated with an access point, and a given value (such as '1') of a given unicast bit may specify a unicast transmission to a given one of the electronic devices. Moreover, as discussed previously with reference to FIG. 6, multi-BSS beacon 1000 may include a transmitted BSSID and one or more non-transmitted BSSIDs.

Figure 11:
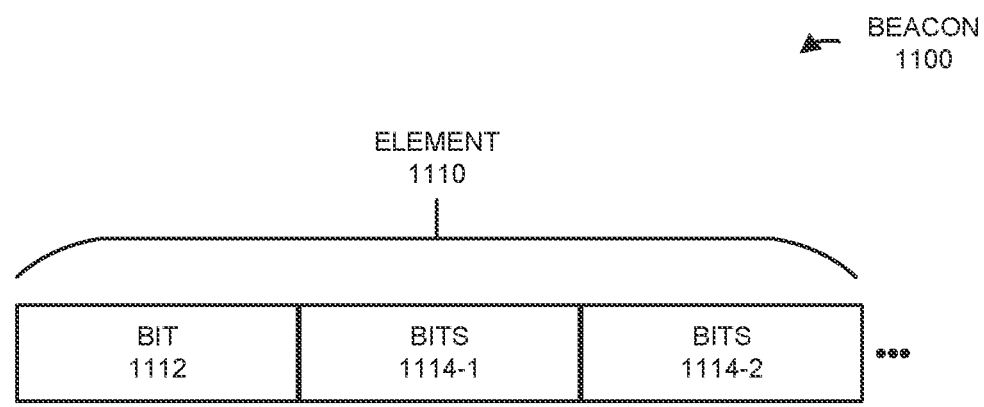
FIG. 11 is a drawing illustrating an example of a beacon in accordance with an embodiment of the present disclosure.

FIG. 11 presents a drawing illustrating an example of a beacon 1100 for a particular BSSID. Notably, beacon 1100 may include an element 1110. A bit 1112 (such as bit zero) in element 1110 may be a broadcast bit, and bits 1114 (such as bits one, two and three) in element 1110 may be reserved for broadcast bits that are targeted to specific electronic devices having SSIDs. (Consequently, the first bit in element 1110 that is available to set or specify an association identifier (AID) may be the next bit after bits 1114.) Moreover, when the first value of bit 1012 (FIG. 10) indicates the broadcast to the group, bit 1112 may have the first value, and a given one of bits 1114 associated with a particular electronic device having an SSID (and corresponding to the same one of bits 1014 in FIG. 10) may also have the first value.

For example, bits 1114 may include three bits. Thus, the first four bits in element 1110 may be reserved for specifying or indicating broadcast bits, either to the entire group (via bit 1112) and/or using specific or targeted bits in bits 1114. Notably, a first client or electronic device may be assigned a first bit (bit one) in bits 1114, a second client or electronic device may be assigned a second bit (bit two) in bits 1114, and a third client or electronic device may be assigned a third bit (bit three) in bits 1114. Consequently, when the broadcast bit is set to the first value in a multi-BSS beacon, a beacon may have bit zero (bit 1112) set to the first value and bit two (in bits 1114) set to the first value.

Note that the multi-BSS beacon 1000 (FIG. 10) and/or beacon 1100 may include additional information, less information or different information from that shown in FIGS. 10 and 11.

We now describe embodiments of an electronic device, which may perform at least some of the operations in the communication techniques. For example, the electronic device may include a component in system 110, such as one of: the one or more access points 112, the one or more electronic devices 114 and/or the one or more optional controllers 116. FIG. 12 presents a block diagram illustrating an electronic device 1200 in accordance with some embodiments. This electronic device includes processing subsystem 1210, memory subsystem 1212, and networking subsystem 1214. Processing subsystem 1210 includes one or more devices configured to perform computational operations. For example, processing subsystem 1210 can include one or more microprocessors, ASICs, microcontrollers, programmable-logic devices, graphical processor units (GPUs) and/or one or more digital signal processors (DSPs).

Memory subsystem 1212 includes one or more devices for storing data and/or instructions for processing subsystem 1210 and networking subsystem 1214. For example, memory subsystem 1212 can include dynamic random access memory (DRAM), static random access memory (SRAM), and/or other types of memory (which collectively or individually are sometimes referred to as a 'computer-readable storage medium'). In some embodiments, instructions for processing subsystem 1210 in memory subsystem 1212 include: one or more program modules or sets of instructions (such as program instructions 1222 or operating system 1224), which may be executed by processing subsystem 1210. Note that the one or more computer programs may constitute a computer-program mechanism. Moreover, instructions in the various modules in memory subsystem 1212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1210.

In addition, memory subsystem 1212 can include mechanisms for controlling access to the memory. In some embodiments, memory subsystem 1212 includes a memory hierarchy that comprises one or more caches coupled to a memory in electronic device 1200. In some of these embodiments, one or more of the caches is located in processing subsystem 1210.

In some embodiments, memory subsystem 1212 is coupled to one or more high-capacity mass-storage devices (not shown). For example, memory subsystem 1212 can be coupled to a magnetic or optical drive, a solid-state drive, or another type of mass-storage device. In these embodiments, memory subsystem 1212 can be used by electronic device 1200 as fast-access storage for often-used data, while the mass-storage device is used to store less frequently used data.

Networking subsystem 1214 includes one or more devices configured to couple to and communicate on a wired and/or wireless network (i.e., to perform network operations), including: control logic 1216, an interface circuit 1218 and one or more antennas 1220 (or antenna elements). (While FIG. 12 includes one or more antennas 1220, in some embodiments electronic device 1200 includes one or more nodes, such as nodes 1208, e.g., a pad, which can be coupled to the one or more antennas 1220. Thus, electronic device 1200 may or may not include the one or more antennas 1220.) For example, networking subsystem 1214 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 1200 may be adapted or changed using pattern shapers (such as reflectors) in one or more antennas 1220 (or antenna elements), which can be independently and selectively electrically coupled to ground to steer the transmit antenna radiation pattern in different directions. Thus, if one or more antennas 1220 includes N antenna-radiation-pattern shapers, the one or more antennas 1220 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 1214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1200 may use the mechanisms in networking subsystem 1214 for performing simple wireless communication between the electronic devices, e.g., transmitting frames and/or scanning for frames transmitted by other electronic devices.

Within electronic device 1200, processing subsystem 1210, memory subsystem 1212, and networking subsystem 1214 are coupled together using bus 1228. Bus 1228 may include an electrical, optical, and/or electro-optical connection that the subsystems can use to communicate commands and data among one another. Although only one bus 1228 is shown for clarity, different embodiments can include a different number or configuration of electrical, optical, and/or electro-optical connections among the subsystems.

In some embodiments, electronic device 1200 includes a display subsystem 1226 for displaying information on a display, which may include a display driver and the display, such as a liquid-crystal display, a multi-touch touchscreen, etc.

Electronic device 1200 can be (or can be included in) any electronic device with at least one network interface. For example, electronic device 1200 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

Although specific components are used to describe electronic device 1200, in alternative embodiments, different components and/or subsystems may be present in electronic device 1200. For example, electronic device 1200 may include one or more additional processing subsystems, memory subsystems, networking subsystems, and/or display subsystems. Additionally, one or more of the subsystems may not be present in electronic device 1200. Moreover, in some embodiments, electronic device 1200 may include one or more additional subsystems that are not shown in FIG. 12. Also, although separate subsystems are shown in FIG. 12, in some embodiments some or all of a given subsystem or component can be integrated into one or more of the other subsystems or component(s) in electronic device 1200. For example, in some embodiments program instructions 1222 are included in operating system 1224 and/or control logic 1216 is included in interface circuit 1218.

Moreover, the circuits and components in electronic device 1200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 1214. The integrated circuit may include hardware and/or software mechanisms that are used for transmitting wireless signals from electronic device 1200 and receiving signals at electronic device 1200 from other electronic devices. Aside from the mechanisms herein described, radios are generally known in the art and hence are not described in detail. In general, networking subsystem 1214 and/or the integrated circuit can include any number of radios. Note that the radios in multiple-radio embodiments function in a similar way to the described single-radio embodiments.

In some embodiments, networking subsystem 1214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1222, operating system 1224 (such as a driver for interface circuit 1218) or in firmware in interface circuit 1218. Alternatively or additionally, at least some of the operations in the communication techniques may be implemented in a physical layer, such as hardware in interface circuit 1218.

Additionally, while the preceding embodiments illustrated the use of wireless signals in one or more bands of frequencies, in other embodiments of these signals may be communicated in one or more bands of frequencies, including: a microwave frequency band, a radar frequency band, 900 MHz, 2.4 GHz, 5 GHz, 60 GHz, and/or a band of frequencies used by a Citizens Broadband Radio Service or by LTE. In some embodiments, the communication between electronic devices uses multi-user transmission (such as orthogonal frequency division multiple access or OFDMA).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to wirelessly communicate with a second electronic device, wherein the interface circuit is configured to:
transmit a multi-basic service set (BSS) beacon that comprises a transmitted basic service set identifier (BSSID) and one or more non-transmitted BSSIDs, wherein the transmitted BSSID and the one or more non-transmitted BSSIDs have separate wireless connection interfaces and different capabilities;
transmit individual beacons for each of the transmitted BSSID and the one or more non-transmitted BSSIDs, wherein a given BSSID in a given individual beacon corresponds to one of: the transmitted BSSID or a given one of the one or more non-transmitted BSSIDs;
receive a probe request associated with the second electronic device, where the probe request comprises a multi-BSS indication; and
selectively transmit a probe response in response to the probe request, wherein a type of the probe response is based at least in part on the multi-BSS indication.

2. The electronic device of claim 1, wherein, when the multi-BSS indication indicates that the second electronic device supports multi-BSS, the type of the probe response comprises an aggregated probe response for the transmitted BSSID and the one or more non-transmitted BSSIDs.

3. The electronic device of claim 1, wherein, when the multi-BSS indication indicates that the second electronic device does not support multi-BSS, the probe response does not comprise an aggregated probe response.

4. The electronic device of claim 3, wherein, when the probe request is a broadcast probe request with a wild-card service set identifier (SSID), the probe response comprises individual probe responses for the transmitted BSSID and the one or more non-transmitted BSSIDs.

5. The electronic device of claim 4, wherein the transmitted BSSID is compatible with a first Institute of Electrical and Electronics Engineers (IEEE) 802.11 standard, a non-transmitted BSSID in the one or more non-transmitted BSSIDs is compatible with a second IEEE 802.11 communication protocol that is different from the first IEEE 802.11 standard, and the transmitted BSSID shares an SSID with the non-transmitted BSSID.

6. The electronic device of claim 5, wherein the first IEEE 802.11 standard comprises one or more of: IEEE 802.11a, IEEE 802.11b, IEEE 802.11g, IEEE 802.11n, or IEEE 802.11ac, and the second IEEE 802.11 standard comprises IEEE 802.11ax.

7. The electronic device of claim 1, wherein the given BSSID is different from the transmitted BSSID or the given one of the one or more non-transmitted BSSIDs.

8. The electronic device of claim 1, wherein the electronic device comprises an access point.

9. The electronic device of claim 1, wherein, when the probe request comprises a broadcast probe request with a wild-card service set identifier (SSID), the probe response comprises the transmitted BSSID and the one or more non-transmitted BSSIDs, or the probe response comprises the transmitted BSSID and one or more additional BSSIDs that correspond to the one or more non-transmitted BSSIDs.

10. The electronic device of claim 1, wherein, when the probe request comprises a broadcast probe request with a wild-card service set identifier (SSID), the probe response comprises the transmitted BSSID and the one or more non-transmitted BSSIDs, or the probe response comprises the transmitted BSSID and one or more additional BSSIDs that correspond to the one or more non-transmitted BSSIDs.

11. A non-transitory computer-readable storage medium for use in conjunction with an electronic device, the computer-readable storage medium storing program instructions, wherein, when executed by the electronic device, the program instructions cause the electronic device to perform one or more operations comprising:
transmitting a multi-basic service set (BSS) beacon that comprises a transmitted basic service set identifier (BSSID) and one or more non-transmitted BSSIDs, wherein the transmitted BSSID and the one or more non-transmitted BSSIDs have separate wireless connection interfaces and different capabilities;
transmitting individual beacons for each of the transmitted BSSID and the one or more non-transmitted BSSIDs, wherein a given BSSID in a given individual beacon corresponds to one of: the transmitted BSSID or a given one of the one or more non-transmitted BSSIDs;

receiving a probe request associated with a second electronic device, where the probe request comprises a multi-BSS indication; and selectively transmitting a probe response in response to the probe request, wherein a type of the probe response is based at least in part on the multi-BSS indication.

12. The non-transitory computer-readable storage medium of claim 11, wherein, when the multi-BSS indication indicates that the second electronic device supports multi-BSS, the type of the probe response comprises an aggregated probe response for the transmitted BSSID and the one or more non-transmitted BSSIDs; and wherein, when the multi-BSS indication indicates that the second electronic device does not support multi-BSS, the probe response does not comprise an aggregated probe response.

13. The non-transitory computer-readable storage medium of claim 11, wherein, when the probe request is a broadcast probe request with a wild-card service set identifier (SSID), the probe response comprises individual probe responses for the transmitted BSSID and the one or more non-transmitted BSSIDs.

14. The non-transitory computer-readable storage medium of claim 11, wherein the given BSSID is different from the transmitted BSSID or the given one of the one or more non-transmitted BSSIDs.

15. A method for selectively transmitting a probe response, comprising:

by an electronic device:

transmitting a multi-basic service set (BSS) beacon that comprises a transmitted basic service set identifier (BSSID) and one or more non-transmitted BSSIDs, wherein the transmitted BSSID and the one or more non-transmitted BSSIDs have separate wireless connection interfaces and different capabilities;

transmitting individual beacons for each of the transmitted BSSID and the one or more non-transmitted BSSIDs, wherein a given BSSID in a given individual beacon corresponds to one of: the transmitted BSSID or a given one of the one or more non-transmitted BSSIDs;

receiving a probe request associated with a second electronic device, where the probe request comprises a multi-BSS indication; and selectively transmitting the probe response in response to the probe request, wherein a type of the probe response is based at least in part on the multi-BSS indication.

16. The method of claim 15, wherein, when the multi-BSS indication indicates that the second electronic device supports multi-BSS, the type of the probe response comprises an aggregated probe response for the transmitted BSSID and the one or more non-transmitted BSSIDs.

17. The method of claim 15, wherein, when the multi-BSS indication indicates that the second electronic device does not support multi-BSS, the probe response does not comprise an aggregated probe response.

18. The method of claim 17, wherein, when the probe request is a broadcast probe request with a wild-card service set identifier (SSID), the probe response comprises individual probe responses for the transmitted BSSID and the one or more non-transmitted BSSIDs.

19. The method of claim 15, wherein the given BSSID is different from the transmitted BSSID or the given one of the one or more non-transmitted BSSIDs.

20. The method of claim 15, wherein, when the probe request comprises a broadcast probe request with a wild-card service set identifier (SSID), the probe response comprises the transmitted BSSID and the one or more non-transmitted BSSIDs, or the probe response comprises the transmitted BSSID and one or more additional BSSIDs that correspond to the one or more non-transmitted BSSIDs.

* * * * *